(No Model.)

2 Sheets—Sheet 1.

J. C. POLAND.
AUTOMATIC REVERSING MECHANISM.

No. 327,409. Patented Sept. 29, 1885.

WITNESSES:
Chas. S. Gooding
A. L. White

INVENTOR:
J. C. Poland
by Wight & Brown
Attys.

(No Model.) 2 Sheets—Sheet 2.

J. C. POLAND.
AUTOMATIC REVERSING MECHANISM.

No. 327,409. Patented Sept. 29, 1885.

WITNESSES:
Chas. S. Gooding
A. L. White

INVENTOR:
J. C. Poland
by Wright & Brown
Attys.

UNITED STATES PATENT OFFICE.

JOHN C. POLAND, OF BOSTON, MASSACHUSETTS.

AUTOMATIC REVERSING MECHANISM.

SPECIFICATION forming part of Letters Patent No. 327,409, dated September 29, 1885.

Application filed February 14, 1885. (No model.)

*To all whom it may concern:*

Be it known that I, JOHN C. POLAND, of Boston, in the county of Suffolk and State of Massachusetts, have invented certain Improvements in Automatic Reversing Mechanism, of which the following is a specification.

This invention has for its object to provide an improved reversing-gear for automatically reversing the rotation of a shaft or cylinder, and is particularly intended for washing-machines.

The invention consists in the improved mechanism which I will now proceed to describe and claim.

Figure 1:
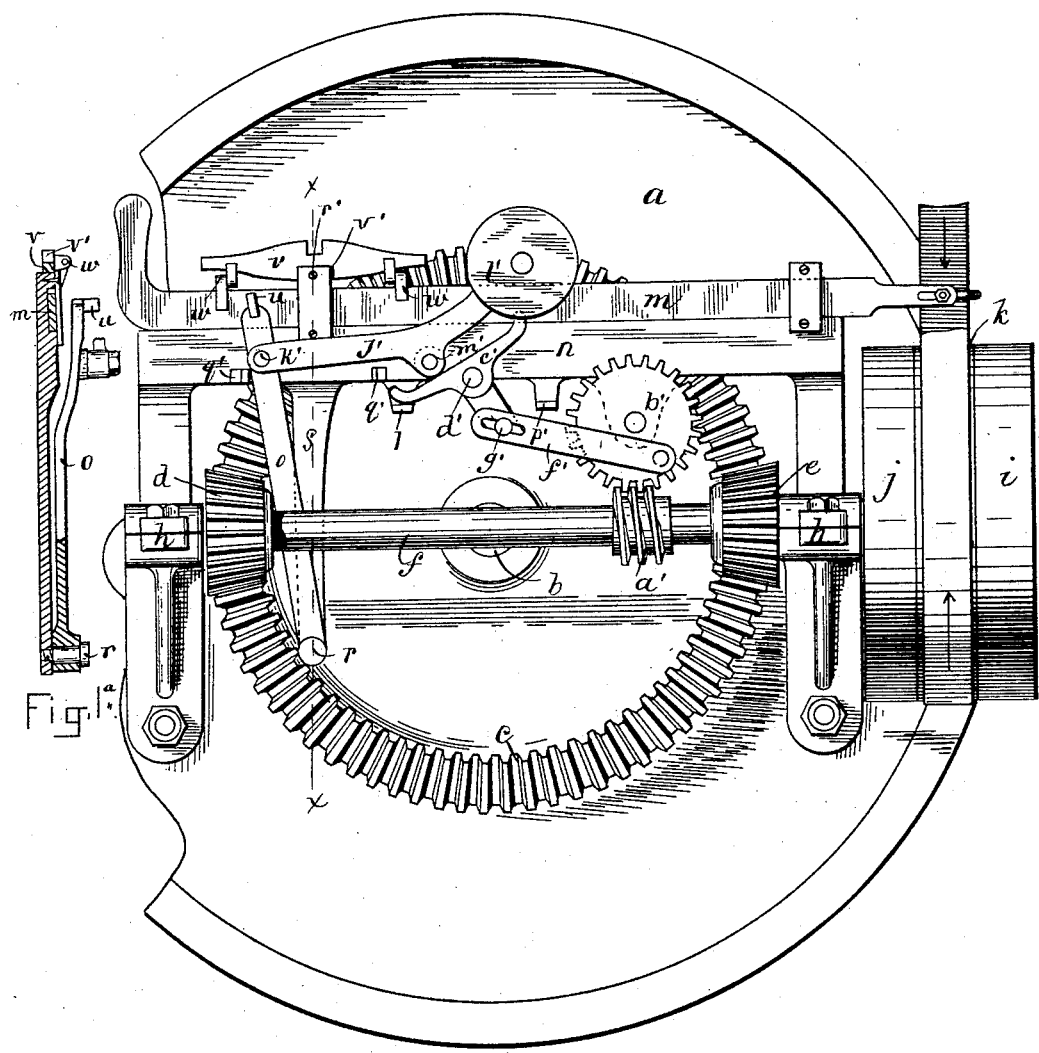
Figure 2:
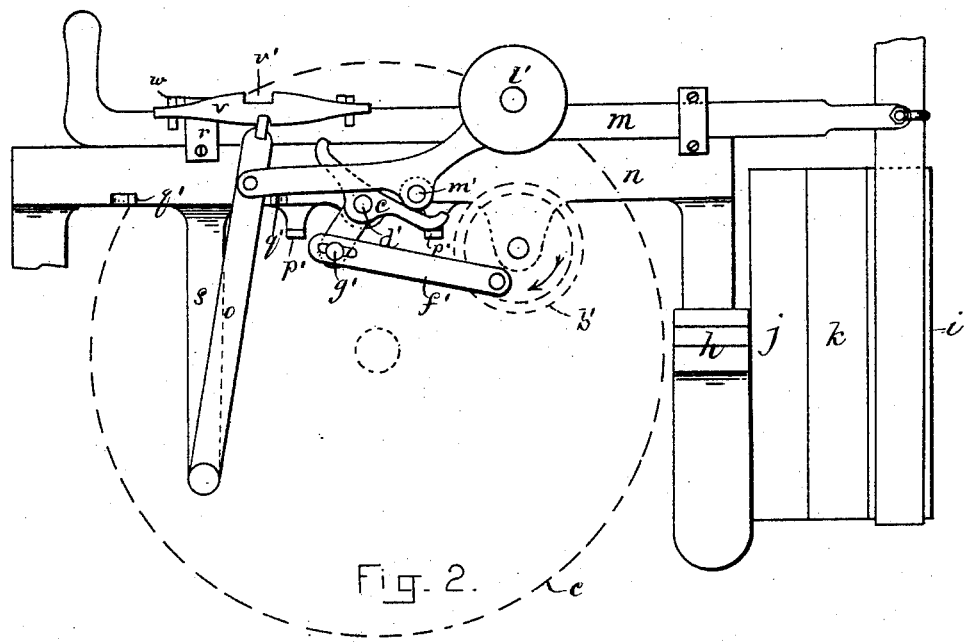
Figure 3:
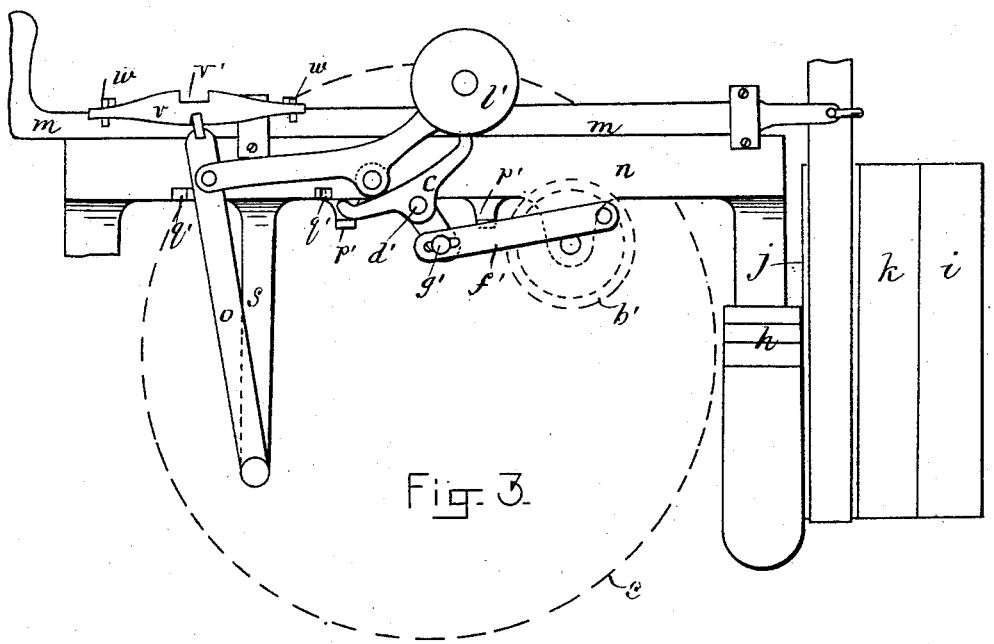

Of the accompanying drawings, forming a part of this specification, Figures 1, 2, and 3 represent end elevations of the fixed casing of a washing-machine provided with my improved mechanism. Fig. 1ª represents a section on line $x\ x$, Fig. 1.

The same letters of reference indicate the same parts in all the figures.

In the drawings, $a$ represents the fixed casing of a washing-machine, and $b$ represents the shaft which rotates the washing mechanism or devices. Within the casing $c$ is a bevel-gear affixed to said shaft, and $d\ e$ are bevel-pinions, the former being affixed to an arbor, $f$, while the latter is affixed to a sleeve, $g$, which is free to turn on the arbor $f$, said arbor passing through the sleeve, as shown in Fig. 1. The arbor $f$ and sleeve $g$ are journaled in brackets $h\ h$, affixed to the casing $a$. To the arbor $f$ is affixed a pulley, $i$, and to the sleeve $g$ is affixed a pulley, $j$. Between said pulleys $i\ j$ is a loose pulley, $k$. The pinions $d\ e$ mesh with the gear $c$ at opposite sides of the shaft, as shown in Fig. 1.

It will be seen, therefore, that when the driving-belt $l$ is on the pulley $j$ the sleeve $g$ and pinion $e$ will be rotated, and will impart motion in one direction to the gear $c$ and shaft $b$, the pinion $d$ and arbor $f$ being rotated by the gear $c$ and not by the driving-belt. When the belt is shipped onto the pulley $i$, the arbor $f$ and pinion $d$ are rotated by the belt, and the gear and shaft are rotated in the opposite direction, the pinion $e$ and sleeve $g$ being rotated idly by the gear.

$m$ represents a shipper-bar adapted to slide on the fixed guide $n$, which is supported by the brackets $h\ h$. Said bar has a loop at one end, through which the belt runs, and is adapted to move the belt laterally in the usual manner to shift it from one pulley to another.

$o$ represents a lever pivoted at $r$ to an arm, $s$, projecting downwardly from the guide $n$, and having at its upper end a pin or stud, $u$, which enters a slot in a dog or latch, $v$, which is connected to the shipper-bar by hinges $w\ w$, so that it can be turned back, as shown in Fig. 2, to disengage it from the pin or stud, and thus disconnect the shipper-bar from the lever when it is desirable to make said bar inoperative.

To the arbor $b$ is affixed a worm, $a'$, with which meshes a worm-wheel, $b'$, supported by an ear on the guide $n$.

$c'$ represents a bar pivoted at $d'$ to the guide $n$, or any suitable fixed support, and provided with an arm, $e'$, which is connected by a pitman or connecting rod, $f'$, with the worm-wheel $b'$, said rod being eccentrically pivoted to the worm-wheel and connected to the arm $e'$ by a stud, $g'$, passing through a slot, $h'$, in the rod, so that the rod, when reciprocated, as hereinafter described, by the movements of the worm-wheel, will have a limited movement independently of the arm $e'$, and will incline the bar $c'$ first in one direction and then in the opposite direction.

$j'$ represents an arm pivoted at $k'$ to the shipper-bar-operating lever $o$, and provided at its free end with a heavy weight, $l'$. The weighted arm is provided with a boss or anti-friction roller, $m'$, between its inner and outer ends, which bears on the bar $c'$, the latter having a straight edge, constituting a track, on which the roller $m'$ may run.

The operation is as follows: The rotation of the arbor $f$ causes the worm $a'$ to rotate the wheel $b'$, and thus give endwise motion to the rod $f'$. When an end of the slot $h'$ strikes the stud $g'$ on the arm $e'$, the endwise movement of the rod causes the arm $e'$ and bar $c'$ to swing on the pivot $d'$, and thus incline said bar in an opposite direction to that in which it was inclined before. The roll $m'$ on the weighted arm $j'$ normally bears on the lowest part of the bar that it is permitted to reach; consequently, when the inclination of the bar is reversed, the arm is first raised and then caused to move by gravitation down the reversed incline of the bar, thus swinging the lever $o$ far enough to cause it to shift the belt from one fast pulley to the other by means of the shipper-bar $m$. The rotation of the gear $c$, and consequently the rotation of the arbor $f$ and worm-wheel $b'$, is thus reversed, and the rod $f'$ is moved endwise in the opposite direction, and when the other end of its slot strikes the stud $g'$ the inclination of the bar $c'$ is again reversed, thus first raising the weighted arm and then permitting it to gravitate in a direction opposite to that which it before gravitated and again shift the belt, the operation being thus continued so long as the shipper-bar is engaged with the lever $o$.

It will be seen that the raising of the weighted arm stores up power, which is expended in shifting the belt when the weighted arm moves by gravitation down the inclined bar. The belt is therefore moved more quickly and positively than in other forms of reversing mechanism heretofore used, in which the shipper-bar is moved by a direct connection with the prime motor instead of by the gravitation of a weight, as shown, for example, in my former application.

I do not limit myself to the described details of construction whereby the weight $l'$ is alternately raised and allowed to gravitate, nor to the means shown for applying the gravitating force of the weight to the shipper-bar, as such details may be variously modified without departing from the spirit of my invention.

The oscillations of the bar $c'$ are limited by stops $p'$ $p'$, which support it at the opposite extreme of its movement, as shown in Figs. 2 and 3. Stops $q'$ $q'$ limit in like manner the oscillations of the lever $o$.

The latch $v$ is provided with a recess, $v'$, which engages with a projection, $r'$, affixed to the guide $n$, when the latch is raised to disengage it from the lever $o$, and the shipper-bar is in position to hold the belt $l$ on the loose pulley $k$, as shown in Fig. 1. The shipper-bar is thus locked, so that the belt cannot be accidentally shifted from the loose pulley to either of the operative pulleys when it is desired to keep the mechanism at rest. The projection $r'$, being located between the hinges $w$ $w$ of the latch $v$, acts as a stop to limit the endwise movements of the shipper-bar, said hinges striking the projection when the shipper-bar reaches the ends of its movements.

I claim—

1. In an automatic reversing mechanism, the combination of a bevel-gear on the shaft or body to be rotated, two pinions, $d$ $e$, meshing with said gear at opposite sides of its center, an arbor, $f$, having a pulley, $i$, affixed to the pinion $d$, a sleeve having a pulley, $j$, affixed to the pinion $e$ and placed loosely on said arbor, and automatic mechanism, substantially as described, operated by the rotation of said arbor, whereby a driving-belt is alternately moved from one of said pulleys to the other, and caused to communicate motion to the shaft alternately through the pinion $d$ and the pinion $e$, as set forth.

2. The shipper-bar having the hinged dog or piece $v$, combined with the lever $o$ and mechanism, substantially as described, for oscillating it, said lever having a pin or device to engage with said dog, as set forth.

3. In an automatic reversing mechanism, the combination, with a belt-shipper, two operative pulleys on which a driving-belt is alternately placed by the belt-shipper, a weight or weighted arm having a connection with the belt-shipper, and mechanism, substantially as described, whereby the weight is raised and then allowed to gravitate to move the belt-shipper when the driving-belt is on one of said pulleys, and is raised and then allowed to gravitate in the opposite direction when the driving-belt is on the other pulley, as set forth.

4. In an automatic reversing mechanism, the combination of a bevel-gear on the shaft or body to be rotated, two pinions, $d$ $e$, meshing with said gear at opposite sides of its center, an arbor, $j$, having a pulley, $i$, affixed to the pinion $d$, a sleeve loose upon said arbor having a shipper-bar adapted to move a driving-belt from one of said pulleys to the other, a lever engaged with the shipper-bar, a weight or weighted arm connected to said lever, and mechanism, substantially as described, whereby said weight is alternately raised and allowed to gravitate and thereby move the belt-shipper, as set forth.

5. The combination of the bevel-gear on the shaft to be rotated, the arbor having the pulley $i$ and pinion $d$, the sleeve on said arbor having the pulley $j$ and pinion $e$, the worm on the arbor and worm-wheel engaging therewith, the pivoted lever $o$, the shipper-bar engaged with said lever, the weight or weighted arm connected with said lever, and devices, substantially as described, operated by the worm-wheel, whereby the weight is alternately raised and allowed to gravitate and thus move the shipper-bar, as set forth.

6. The combination of the arbor $f$, mechanism, substantially as described, to rotate it, the worm and worm-wheel rotated by the arbor, the pivoted bar $c'$, the rod $f'$, connecting said bar with the worm-wheel, whereby the bar is rocked or inclined in different directions, the shipper-bar $m$, the pivoted lever $o$, engaged therewith, and the weight or weighted arm connected to said lever and bearing on the bar $c'$, said bar being successively inclined in opposite directions by the worm-wheel and connecting-rod, whereby the weight is successively raised and allowed to gravitate, as set forth.

7. The combination of the sliding shipper-bar, the latch $v$, pivoted thereto, and a fixed projection or stop, $r'$, arranged to engage with the latch $v$ and lock the shipper-bar when the belt is in the loose pulley, as set forth.

In testimony whereof I have signed my name to this specification, in the presence of two subscribing witnesses, this 31st day of January, 1885.

JOHN C. POLAND.

Witnesses:
C. F. BROWN,
H. BROWN.